United States Patent [19]

Little

[11] Patent Number: 4,547,288
[45] Date of Patent: Oct. 15, 1985

[54] METALLIC PROFILE WIRE SCREEN FOR A FILTER SURFACE

[75] Inventor: David H. Little, Lakeland, Fla.

[73] Assignee: Murray Industries, Tampa, Fla.

[21] Appl. No.: 606,148

[22] Filed: May 2, 1984

Related U.S. Application Data

[63] Continuation-in-part of Ser. No. 445,855, Dec. 1, 1982, abandoned.

[51] Int. Cl.[4] ............................................. B01D 33/24
[52] U.S. Cl. ................................... 210/232; 210/330; 210/344; 210/345
[58] Field of Search ............... 210/203, 404, 402, 393, 210/328, 473, 474, 343, 344, 345, 232, 230, 330, 450, 331, 333.1, 333.01, 346, 347, 460, 461, 483, 486, 498, 541; 209/260

[56] References Cited

U.S. PATENT DOCUMENTS

| Re. 24,150 | 5/1956 | Delruelle | 210/385 |
|---|---|---|---|
| 1,860,937 | 5/1932 | McCaskell | 210/230 |
| 3,139,404 | 6/1964 | Stock | 210/328 |
| 3,216,576 | 11/1965 | Roos | 210/328 |
| 3,389,800 | 6/1968 | Roos | 210/328 |
| 3,426,909 | 2/1969 | Garner | 210/328 |
| 3,491,886 | 1/1970 | Glos et al. | 210/232 |
| 4,391,706 | 7/1983 | Steinkraus | 210/344 |

Primary Examiner—Richard V. Fisher
Assistant Examiner—Wanda L. Millard
Attorney, Agent, or Firm—A. W. Fisher, III

[57] ABSTRACT

A metallic profile wire screen for a filter surface for use with a tilting pan type filter exhibiting sufficient open area for acceptable liquid flow with optimum spacing between the profiled wires for the retention of solids being filtered.

3 Claims, 6 Drawing Figures

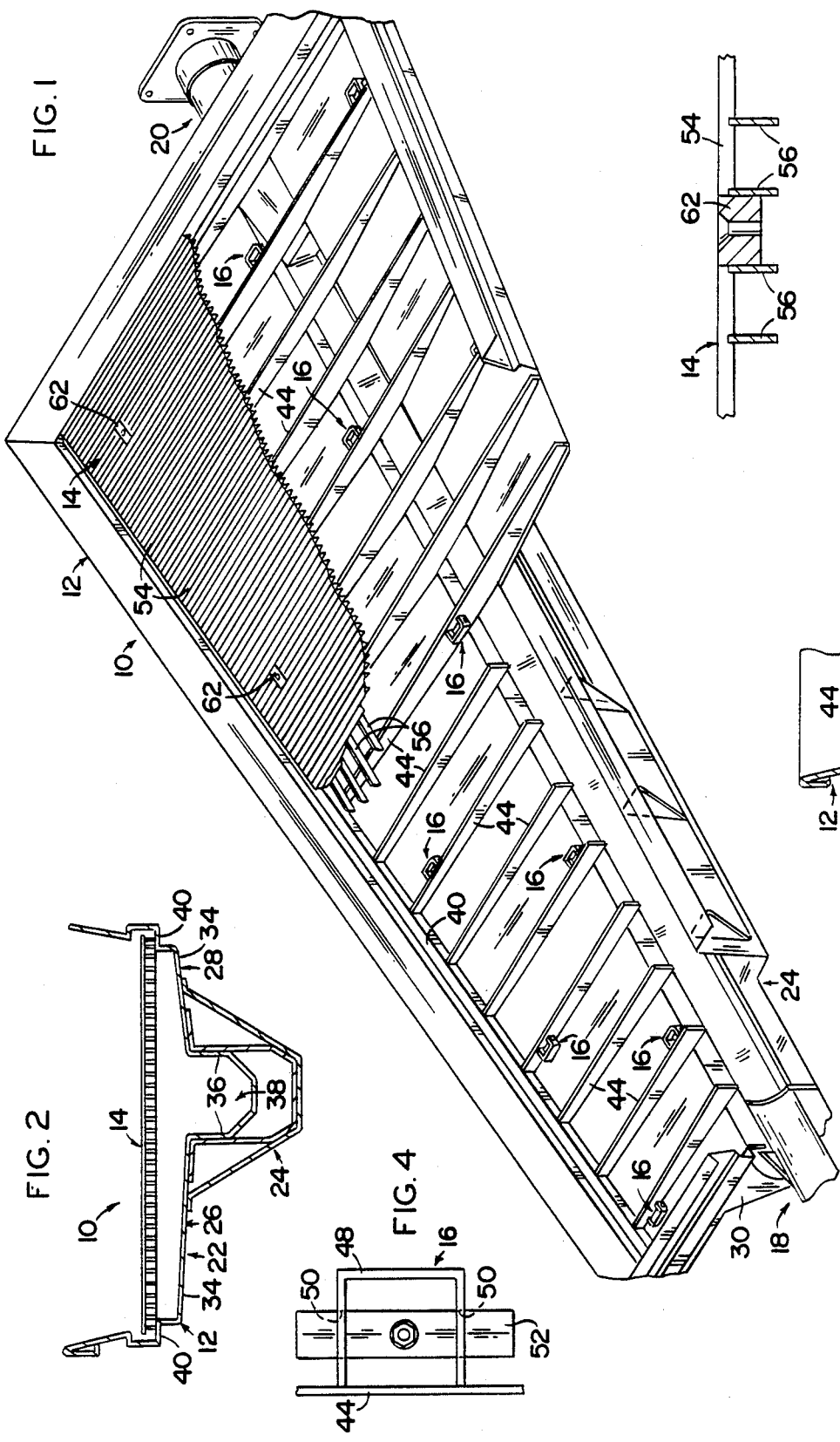

METALLIC PROFILE WIRE SCREEN FOR A FILTER SURFACE

COPENDING APPLICATION

This application is a continuation-in-part application of Ser. No. 445,855 filed Dec. 1, 1982, now abandoned.

BACKGROUND OF THE INVENTION

1. Field of the Invention

A filter surface specifically configured for use with a filter pan in the separation of liquids from solids such as the separation of phosphoric acid from phosphoric slurry.

2. Description of the Prior Art

A number of filtering apparatus comprising a large horizontal filter medium for use in the production of phosphoric acid and treatment of metal ores have been developed.

Typically a pan is disposed below the filter medium to receive the filtrate. Vacuum is applied to the pan. Slurry is fed to the upper surface of the horizontal medium. Gravity and the pressure of the atmosphere cause the filtrate to pass through the medium. Solids, which are retained by the pore size of the filter medium, deposit on the upper surface, are periodically air dried and then removed either by inverting the filter or by scraping.

U S. Pat. No. 3,139,404 relates to large horizontal rotary filter structure. As disclosed a multiplicity of filter cells, each comprising a pan and a horizontally disposed filter medium, are supported in circular array for charging, draining, and washing. Each cell is overturned at the end of each filtering cycle for discharge of filter cake. The rotary filter includes the pivotal cell filter in which each cell is mounted for pivotal inversion about an axis which extends generally radially from the center of the numerous stations past which cells rotate, and inversion and return of the cells is easily effected as with a controlling cam track.

The filter medium is typically interwoven monofilament made of polypropylene, polyethylene with some very few made of polyester. The woven cloth is supported by ribs or perforated plate to withstand the filter cake weight and effect of the vacuum.

Embedding of crystals within the cloth, tilting the pans, as described above, and intensity of washing severly limit the life of the cloth. Typical cloth life is two to three weeks before replacement.

U.S. Pat. No. 4,391,706 discloses a filter element sealing device with a metal plate and sealing strip to secure the filter cloth to the filter pan.

U.S. Pat. No. 3,491,886 relates to a polygonal filter sector with filter media or filter cloth overlaying each sector face secured in place by a stretcher frame for holding the media, or filter cloth taut over the panels.

U.S. Pat. No. 1,860,937 describes an improved means for securing filter media in a disc filter to permit more easily replacing and renewing filter leaves.

In all the above prior art, attempts have been made to improve the arrangement of holding the filter media, or filter cloth to promote rapid cloth changing or improve filter cloth life.

The present invention seeks to provide a simple means to facilitate the separation of a liquid such as phosphoric acid from calcium sulfate by eliminating the use of filter media or filter cloth by replacing both the filter cloth and support grid with a profiled metal surface which does not require frequent renewal and may be cleaned by washing without removal from the filter structure.

Other examples of the proir art are: U.S. Pat. Nos. 24,150; 3,139,404; 3,216,567; 3,216,576; 3,426,909.

SUMMARY OF THE INVENTION

The present invention relates to a metal filter surface screen for use with a tiltable pan type or scroll removal type filter, to receive and filter a slurry of solids and liquids.

The present invention provides a means to reduce labor costs presently associated with changing and renewing filter cloths associated with prior art process. The present invention also reduces costs associated with the continuing procurement of filter media or filter cloths used in the prior art process.

In addition, the present invention promotes a substantial reduction of non-productive time such as is now incurred by manufacturers such as phosphoric acid producers during the course of changing and renewing the filter media or filter cloth.

The filter surface screen or filter medium is a metallic screen surface composed of a plurality of profiled wires closely placed and a support portion made of a plurality of shaped or rectangular rods which are welded or otherwise affixed to each of the wires. The openings between profiled wires allow filtrate to pass through the trough, while the proximity of wires, one to another, retains the filter cake comprised of fine crystals. A filter medium as described, most appropriately functions in a filter cell comprised of a filter pan or rotating horizontal filter surface.

The filter pan comprises a pan bottom comprising a first and second longitudinal side member and a pair of lateral end members.

The longitudinal side members each comprise an inclined surface sloping inwardly and terminating in an innermost element to cooperatively form a trough. Extending upwardly from the outer portion of the inclined surface is a support ledge to receive and operatively support the filter grid. The end plates are similarly constructed.

A plurality of grid supports each extend laterally across filter cell in fixed space relation relative to each other.

Each filter medium anchor comprises a substantially U-shaped bracket including a pair of elongated apertures and elongated flat slide bar extending through the elongated aperture.

The filter medium includes a plurality of apertures to permit the liquid to flow therethrough to the trough under vacuum. In addition, a plurality of fastener apertures corresponding to the filter medium anchors are formed thereon. A fastener block is attached to the filter medium for each anchor location.

The function of the floating nut anchor or filter medium anchor is to provide a positive lock of the filter medium in position within the filter pan. Also, it provides needed adjustment for centering the filter medium with the filter pan and allows the media to be completely interchangeable within a given filter pan size. Moreover, it facilitates rapid removal and replacement of grid for ready access to the pan bottom for cleaning.

In operation the filter comprises a horizontal circular frame about its axis. On this frame are mounted a plurality of the filter cells to selectively tilt under the control of a cam about a generally radial axis. In this embodiment vacuum lines are provided to produce a vacuum in the cell below and filter medium which extends horizontally over the cell, in the filtering position.

During the rotary travel of the frame each cell receives a charge of solid and liquid slurry. After initial drainage of the liquid through the filter medium, a solid cake is subjected to repeated washings by the liquid at these stages also passing through the filter medium, though valved to different locations due to the increased dilution of the liquid. When washing is completed, the filter cell is inverted under the control of the cam, the solid cake being dumped into a receptacle (not shown) the filter cell is cleansed, and the cycle is repeated.

Successful filtration by the profiled wire medium requires the proper combination of strength to withstand loadings, open area for acceptable capacity and opening size to limit solids pass-through.

The profile wires welded to support rods provides a horizontal surface strong enough to withstand the loadings of slurry weight and effect of vacuum, wear of the cake sliding off during tilting, and fatigue flexing during intense washing cycles. The profile wire surface would replace the woven filter cloth and its supporting perforated plate or closely spaced supporting ribs.

Unit capacity is affected by the functioning open area of the filter medium. Woven filter cloth tends to trap crystals within the woven fibers and is relunctant to release them during washing operations. Further, the water pressure used in washing operations is limited due to the cloths tending to trap. Plugging continues until the woven cloth becomes unusable due to low capacity or tears as a result from washing action. A profiled wire surface does not trap the crystals, can withstand much higher water pressure in the washing operation and, therefore, maintains capacity over a long operating period.

The invention accordingly comprises the features of filter medium construction, combination of elements, and means of filter cake retention that will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which:

FIG. 1 is a perspective view of a filter cell.

FIG. 2 is a cross-sectional end view of the filter cell.

FIG. 3 is a detailed cross-sectional side view of the end journal.

FIG. 4 is a detailed top view of the filter medium anchors.

FIGS. 5A and 5B are detailed side views of a bolt block.

Similar reference characters refer to similar parts throughout the several views of the drawings.

DETAILED DESCRIPTION OF THE PREFERRED EMBODIMENT

As best shown in FIG. 1, the present invention relates to a new and improved filter surface screen and filter pan combination for use with a tiltable pan type filter similar to that illustrated in U.S. Pat. No. RE, 24,150, Delruelle U.S. Pat. No. 3,216,567 to John Roos and U.S. Pat. No. 3,426,909 to E. V. Garner. Such a filter medium is to receive a slurry of solids and liquids These filters by differential pressure created through vacuum or the like permit the liquid to pass through the filter medium while the solids accummulate as a solid mass on the filter surface screen or filter medium. This solid mass is then periodically discharged from the filter by dumping or scraping.

As shown in FIGS. 1 through 3, the filter cell 10 comprises a filter pan 12, filter medium 14, a plurality of adjustable filter medium anchors each generally indicated as 16, and an inner and outer end journal generally indicated as 18 or 20 respectively.

As best shown in FIGS. 1 and 2, the filter pan 12 comprises a pan bottom and trough cover generally indicated as 22 and 24 respectively. The pan bottom 22 comprises a first and second longitudinal side member generally indicated as 26 and 28 respectively and a pair of lateral end members each generally indicated as 30.

The first and second longitudinal side member 26 and 28 each comprise an inclined surface 34 sloping inwardly and terminating in an innermost element 36 to cooperatively form a trough 38. Extending upwardly from the outer portion of the inclined surface 34 is a support ledge 40 to receive and operatively support the filter medium 14.

A plurality of grid supports each indicated as 44 extend laterally across filter cell 10 in fixed spaced relation relative to each other. The grid supports 44 on approximately 9 inch centers not only provide structural rigidity to the filter pan 12 but permit a light weight filter medium or screen 14.

The support ledge 40 provides a "rest" for the filter medium 14 and, in so doing, in conjunction with suitable rubber gaskets permits a vacuum seal completely around the inside perimeter of the filter cell 10.

Moreover, the filter medium 14 can be constructed in one piece and lifted directly to and from the filter cell 10.

As best shown in FIGS. 1 and 4, each filter medium anchor 16 comprises substantially U-shaped bracket 48 including a pair of elongated apertures 50 and elongated flat slide bar 52 extending through the elongated aperture 50.

The filter medium 14 comprises a plurality of longitudinally disposed elongated substantially V-shaped wires each indicated as 54 operatively supported and held in fixed spaced relationship by a plurality of support rods 56 disposed in lateral relationship relative to the substantially V-shaped rods or elements 54. The separation between the adjacent V-shaped elements or rods 54 cooperatively form continuous slot openings 58 of a predetermined dimension to permit and enhance the formation of an initial filter layer caused by the crystals in the slurry as they engage the upper portion of the plurality of substantially V-shaped element 54. The invention is specifically configured for filtering a slurry comprising a mixture of gypsum and phosphoric acid. The spaced relation between adjacent V-shaped elements 54 is between the range of 0.004 inches and 0.010 inches the preferred separation being 0.008 inches. This is dictated by the optimum drop through time versus solid retention. The slots 58 effectively form a two point filter rather than the four point filter found in a mesh screen or medium. As best shown in FIG. 5B, the V-shaped configuration of elements 54 create channels of increasing cross sectional area 60. This in combination with the continuous slot openings 58 permit the fluid to flow therethrough to the trough 38 under vacuum. In addition, a plurality of fastener blocks each indicated as 62 corresponding to the filter medium anchor 16 are formed thereon. As best shown in FIGS. 5A and 5B, a drilled block 62 is fastened into the filter medium surface itself. Each fastener block 62 is in fixed spaced relation relative to the lower surface of the filter medium 14 and to the medium anchor 16.

The function of the filter medium anchor 16 is to provide a positive lock to keep filter medium 14 in position within the filter pan 12. Also it provides needed adjustment for centering the filter medium 14 within the filter pan 12, and allows the medium 14 to be completely interchangeable within a given filter pan size. Moreover, it facilitates rapid removal and replacement of medium 14 for ready access to the pan bottom 22 for cleaning.

In operation, the filter comprises a horizontal circular frame (not shown) rotatable about its axis. On this frame are mounted a plurality of the filter cells 10 to selectively tilt under the control of a cam (not shown) about a generally radial axis. In this embodiment vacuum lines (not shown) are provided to produce a vacuum in the cell 10 below the filter medium 14 which extends horizontally, in the filtering position.

During the rotary travel of the frame each cell 10 receives a charge of solid and liquid slurry. After initial drainage of the liquid through the filter medium, a solid cake is subjected to repeated washings, the liquid at these stages also passes through the filter medium, though valved to different locations due to the increased dilution of the liquid. When washing is completed the filter cell 10 is inverted under the control of the cam, the solids cake being dumped into a receptacle (not shown), the filter cell 10 is cleansed and the cycle is repeated.

It will thus be seen that the objects set forth above, and those made apparent from the preceding description are efficiently attained and since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which as a matter of language, might be said to fall therebetween.

Now that the invention has been described,
What is claimed is:

1. A filter cell with a profiled metallic wire filter surface for use with a tiltable pan type filter to filter slurry: said filter cell comprises a filter pan cooperatively formed by a pan bottom having a trough extending longitudinally therein and a pair of side members and a pair of end members, and a filter medium support to operatively support a filter medium, said filter medium comprising a plurality of elements held in fixed spaced relationship relative to each other by a plurality of support rods wherein adjacent elements cooperatively form continuous slot openings therebetween and a plurality of adjustable filter medium anchors attached to said filter medium support to secure said filter medium thereto, each said adjustable filter medium anchor comprises a substantially horizontally positioned U-shaped bracket including means defining a pair of elongated apertures formed through opposite sides thereof having an elongated slide bar extending between and through said pair of elongated apertures and a corresponding plurality of fastener plates affixed to said filter medium, said elongated slide bars and said corresponding plurality of fastener plates each including means defining corresponding apertures formed therein to receive a corresponding plurality of fasteners therethrough to attach said plurality of fastener plates to said corresponding elongated slide bars to permit lateral and longitudinal adjustment of said filter medium relative to said filter pan.

2. The filter cell of claim 1 wherein said filter medium support comprises a plurality of grid supports extending laterally across said filter pan.

3. The filter cell of claim 2 wherein said filter medium support further includes a filter medium support ledge formed about the inner periphery of said filter pan.

* * * * *